(12) United States Patent
Crosbie et al.

(10) Patent No.: US 8,489,688 B2
(45) Date of Patent: *Jul. 16, 2013

(54) MANAGING DELIVERY OF ELECTRONIC MEETING CONTENT

(75) Inventors: Mark Crosbie, Malahide (IE); Javier Marcos de Prado, Dublin (IE); Patrick Joseph O'Sullivan, Ballsbridge (IE); Annette Susan Hoag Riffe, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,545

(22) Filed: Jun. 6, 2012

(65) Prior Publication Data

US 2012/0246237 A1    Sep. 27, 2012

Related U.S. Application Data

(63) Continuation of application No. 12/982,372, filed on Dec. 30, 2010.

(51) Int. Cl.
*G06F 15/16*    (2006.01)

(52) U.S. Cl.
USPC ......................................... 709/205; 709/204

(58) Field of Classification Search
USPC ......................................... 709/204, 206, 205
See application file for complete search history.

(56) References Cited

U.S. PATENT DOCUMENTS

| | | | |
|---|---|---|---|
| 5,963,217 A | 10/1999 | Grayson et al. | |
| 6,085,241 A | 7/2000 | Otis | |
| 6,161,137 A | 12/2000 | Ogdon et al. | |
| 6,677,979 B1* | 1/2004 | Westfield | 348/14.12 |
| 6,701,316 B1 | 3/2004 | Li et al. | |
| 6,813,580 B2 | 11/2004 | Florschuetz | |
| 7,675,856 B2 | 3/2010 | Padmanabhan et al. | |
| 2008/0016185 A1 | 1/2008 | Herberger et al. | |
| 2012/0206559 A1* | 8/2012 | Lin et al. | 348/14.08 |

OTHER PUBLICATIONS

IBM "System and Method for Providing Synchronized Web Conferences", IPCOM000191070D, Dec. 15, 2009.
Christian Benvenuti, "Bandwidth Optimization," International Centre for Theoretical Physics (ICTP), Trieste, AfREN 2007, Apr. 28-29, 2007, Abuja, Nigeria, pp. 1-21.

* cited by examiner

*Primary Examiner* — Mohamed Wasel
(74) *Attorney, Agent, or Firm* — Holland & Knight LLP; Brian J. Colandreo, Esq.; Jeffrey T. Placker, Esq.

(57) ABSTRACT

A first portion of electronic meeting content is transmitted to a first client computing device. The first portion of the electronic meeting content configured to provide a first content resolution that is less than a full content resolution. A second portion of the electronic meeting content is transmitted to the first client computing device. The second portion of the electronic meeting content configured to provide a second content resolution that is greater than the first content resolution. The second portion of the electronic meeting content combined with the first portion of the electronic meeting content provides progressive refinement of electronic meeting content transmitted to the first client computing device.

7 Claims, 7 Drawing Sheets

MANAGING DELIVERY OF ELECTRONIC MEETING CONTENT

RELATED APPLICATIONS

The subject application is a continuation application of U.S. patent application with Ser. No. 12/982,372, filed on Dec. 30, 2010, the entire content of which is herein incorporated by reference.

BACKGROUND OF THE DISCLOSURES

The present disclosure relates to electronic meetings, and more particularly relates to managing the delivery of electronic meeting content for enhanced user experience.

Electronic meetings (e.g., web conferences) may often be used to conduct meetings between geographically dispersed participants. As opposed to the audio only format that is provided by a teleconference, an electronic meeting may allow the participants of the electronic meeting to utilize a variety of different types of content, which may more closely approximate a live, or in person meeting. For example, electronic meeting systems may allow content such as text document, slides (such as photographic slides, presentation slides, or the like), graphics, drawings or shared whiteboards, and even video to be shared or consumed by the participants of the meeting, as well as conventional audio content. This variety of content may allow for a fuller, more productive, meeting environment that may greatly facilitate the exchange and sharing of information.

SUMMARY OF THE DISCLOSURE

According to a first implementation, a method includes transmitting, by a computing device, a first portion of electronic meeting content to a first client computing device. The first portion of the electronic meeting content is configured to provide a first content resolution that is less than a full content resolution. A second portion of the electronic meeting content is transmitted by the computing device to the first client computing device. The second portion of the electronic meeting content is configured to provide a second content resolution that is greater than the first content resolution. The second portion of the electronic meeting content combined with the first portion of the electronic meeting content provides progressive refinement of electronic meeting content transmitted to the first client computing device.

One or more of the following features may be included. A reception capacity associated with the first client computing device may be determined. The first portion of the electronic meeting content may be based upon, at least in part the determined reception capacity associated with the first client computing device.

The first portion of the electronic meeting content may be associated with at least a first component of the electronic meeting content. The second portion of the electronic meeting content may be associated with at least a second component of the electronic meeting content. The second portion of the electronic meeting content may be configured to provide the second content resolution in conjunction with the first portion of the electronic meeting content.

The method may also include transmitting one or more additional portions of the electronic meeting content to the first client computing device. The one or more additional portions of the electronic meeting content may be configured to provide a content resolution greater than the second content resolution.

According to another implementation, a computer program product resides on a computer readable medium having a plurality of instructions stored on it. When executed by a processor, the instructions cause the processor to perform operations including transmitting a first portion of electronic meeting content to a first client computing device. The first portion of the electronic meeting content is configured to provide a first content resolution that is less than a full content resolution. The instruction also cause the processor to transmit a second portion of the electronic meeting content to the first client computing device. The second portion of the electronic meeting content is configured to provide a second content resolution that is greater than the first content resolution. The second portion of the electronic meeting content combined with the first portion of the electronic meeting content provides progressive refinement of electronic meeting content transmitted to the first client computing device.

One or more of the following features may be included. Instructions may be included for determining a reception capacity associated with the first client computing device. The first portion of the electronic meeting content may be based upon, at least in part the determined reception capacity associated with the first client computing device.

The first portion of the electronic meeting content may be associated with at least a first component of the electronic meeting content. The second portion of the electronic meeting content may be associated with at least a second component of the electronic meeting content. The second portion of the electronic meeting content may be configured to provide the second content resolution in conjunction with the first portion of the electronic meeting content.

Instructions may also be included for transmitting one or more additional portions of the electronic meeting content to the first client computing device. The one or more additional portions of the electronic meeting content may be configured to provide a content resolution greater than the second content resolution.

According to yet another implementation, a system includes a processor and a memory. A first software module is executable by the processor and the memory. The first software module is configured to transmit a first portion of electronic meeting content to a first client computing device. The first portion of the electronic meeting content is configured to provide a first content resolution that is less than a full content resolution. A second software module is also executable by the processor and the memory. The second software module is configured to transmit a second portion of the electronic meeting content to the first client computing device. The second portion of the electronic meeting content is configured to provide a second content resolution that is greater than the first content resolution. The second portion of the electronic meeting content combined with the first portion of the electronic meeting content provides progressive refinement of electronic meeting content transmitted to the first client computing device.

One or more of the following features may be included. A third software module may be executable by the processor and the memory. The third software module may be configured to determine a reception capacity associated with the first client computing device. The first portion of the electronic meeting content may be based upon, at least in part the determined reception capacity associated with the first client computing device.

The first portion of the electronic meeting content may be associated with at least a first component of the electronic meeting content. The second portion of the electronic meeting content may be associated with at least a second component of the electronic meeting content. The second portion of the electronic meeting content may be configured to provide the second content resolution in conjunction with the first portion of the electronic meeting content.

A fourth software module may be executable by the processor and the memory. The fourth software module may be configured to transmit one or more additional portions of the electronic meeting content to the first client computing device. The one or more additional portions of the electronic meeting content may be configured to provide a content resolution greater than the second content resolution.

The details of one or more implementations are set forth in the accompanying drawings and the description below. Other features will become apparent from the description, the drawings, and the claims.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
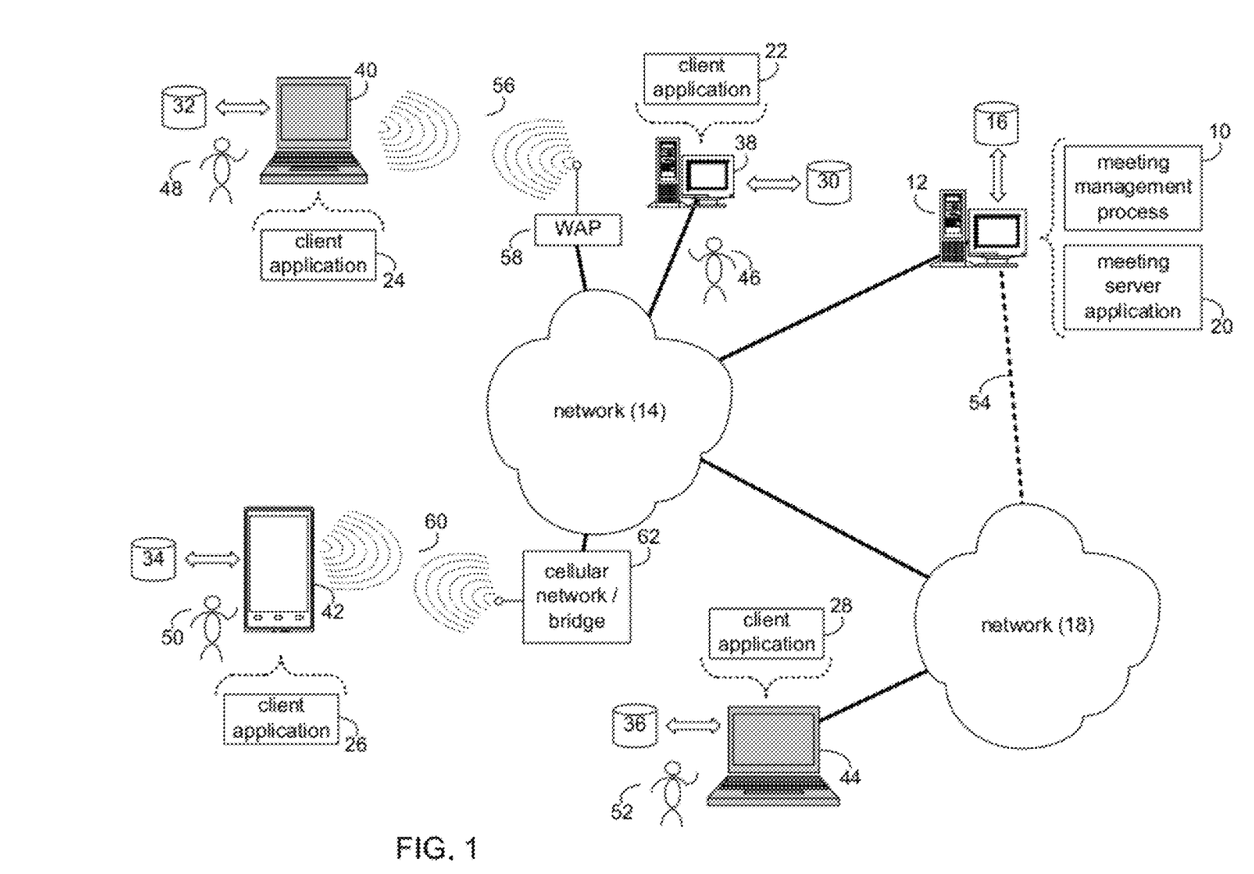
FIG. 1 diagrammatically depicts a meeting management process coupled to a distributed computing network.

Referring to FIG. 1, there is shown meeting management process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the meeting management process may reside on and be executed, in whole or in part, by a client electronic device, such as a personal computer, notebook computer, personal digital assistant, or the like. Further, the meeting management process may operate from within a cloud computing environment.

Unfortunately, many types of content that may be utilized during an electronic meeting may be quite bandwidth intensive, impeding the ability of some users to receive the content at the real-time pace of the meeting, if at all. Similarly, some participants of the meeting may have less than ideal network conditions, which may also impede the ability of those users to receive the content at the real-time pace of the meeting. As a consequence, the electronic meeting may often be slowed to the pace of the lowest common denominator of participants ability to receive content. Such situations may disrupt the flow and continuity of an electronic meeting. As will be discussed below in greater detail, meeting management process 10 may transmit a first portion of electronic meeting content to a first client computing device. The first portion of the electronic meeting content may be configured to provide a first content resolution that is less than a full content resolution. Meeting management process 10 may also transmit a second portion of the electronic meeting content to the first client computing device. The second portion of the electronic meeting content may be configured to provide a second content resolution that is greater than the first content resolution. The second portion of the electronic meeting content combined with the first portion of the electronic meeting content provides progressive refinement of electronic meeting content transmitted to the first client computing device.

The instruction sets and subroutines of meeting management process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute electronic meeting server application 20, examples of which may include but are not limited to, e.g., IBM® LotusLive™, Adobe® Connect™, Microsoft Office Live Meeting, WebEx®, or the like. (IBM, and LotusLive are trademarks of International Business Machines Corporation in the United States, other countries or both; Adobe and Adobe Connect are trademarks of Adobe Systems Incorporated in the United States, other countries or both; WebEx is a registered trademark of Cisco Systems, Inc. in the United States, other countries or both). Electronic meeting server application 20 may allow an electronic meeting (for example, a web conference) to be conducted via meeting client applications, e.g., client applications 22, 24, 26, 28, examples of which may include a web browser or a custom electronic meeting client application. The electronic meeting may allow collaboration between geographically dispersed participants (e.g., at least one or the participants is not in the same room as at least another of the participants). The collaboration may include the sharing and/or consumption of content such as text document, slides (such as photographic slides, presentation slides, or the like), graphics, drawings or shared whiteboards, and video. Additionally, the electronic meeting may include audio collaboration, provided by meeting server application 20 (e.g., using voice over IP or other suitable mechanism), or a separate system (such as a stand-alone voice over IP system, conventional telephone system, or the like). In addition/as an alternative to electronic meeting server application 20 residing on server computer 12, and delivering electronic meeting content to meeting client applications (e.g., client applications 22, 24, 26, 28), electronic meeting server application 20 may operate within a cloud computing environment. As such, electronic meeting content may be delivered to the meeting client applications from the cloud environment. Meeting management process 10 may be a stand alone application, or may be an applet/application/script that may interact with and/or be executed within the environment of an electronic meeting application (e.g., may be executed within electronic meeting server application 20).

The instruction sets and subroutines of electronic meeting server application 20, which may be stored on storage device 16 coupled to server computer 12 may be executed by one or more processors (not shown) and one or more memory modules (not shown) incorporated into server computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access electronic meeting server application 20 and may allow users to e.g., participate in an electronic meeting, host an electronic meeting, and the like.

Users 46, 48, 50, 52 may access electronic meeting server application 20 directly through the device on which the client application (e.g., client applications 22, 24, 26, 28) is executed, namely client electronic devices 38, 40, 42, 44, for example. Users 46, 48, 50, 52 may access electronic meeting server application 20 directly through network 14 or through secondary network 18. Further, server computer 12 (i.e., the computer that executes electronic meeting server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

For the purpose of the following description, client application 26 may be discussed. However, this is for illustrative purposes only and should not be construed as a limitation of the present disclosure, as other client applications (e.g., client application 22, 24, 28) may be equally utilized.

Figure 2:
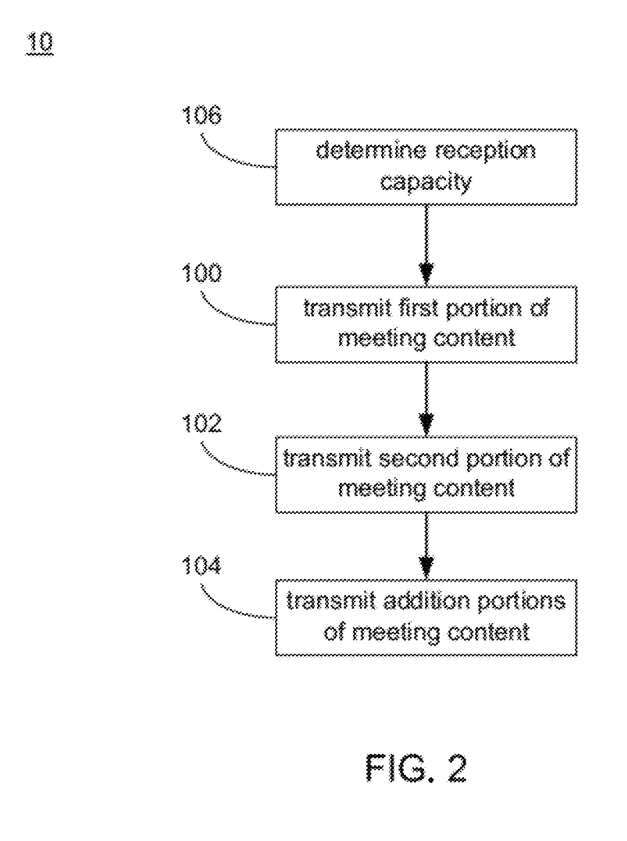
FIG. 2 is a flowchart of a process executed by the meeting management process of FIG. 1.

Referring also to FIG. 2, meeting management process 10 may transmit a first portion of electronic meeting content to a first client computing device. The first portion of the electronic meeting content may be configured to provide a first content resolution that is less than a full content resolution. Meeting management process 10 may also transmit a second portion of the electronic meeting content to the first client computing device. The second portion of the electronic meeting content may be configured to provide a second content resolution that is greater than the first content resolution. The second portion of the electronic meeting content combined with the first portion of the electronic meeting content provides progressive refinement of electronic meeting content transmitted to the first client computing device.

For example, assume that users 46, 48, 50, and 52 are participating in an electronic meeting, conducted via electronic meeting server application 20, using their respective client devices (e.g., client electronic devices 38, 40, 42, 44) executing respective client applications (e.g., client application 22, 24, 26, 28). During the electronic meeting various types of content may be shared and/or consumed by the participants of the electronic meeting. For example, as discussed above, the various types of content may include, but is not limited to, text document, slides (such as photographic slides, presentation slides, or the like), graphics, drawings or shared whiteboards, and video. Due to varying network conditions experienced at the various client electronic devices, the ability and speed at which the various client electronic devices are able to receive the content of the electronic meeting may also vary.

As mentioned above, different client electronic devices may experience different network conditions, such as available bandwidth, network latency, network congestion, and the like. The different network conditions experienced by the various client electronic device may impact the rate at which a given client electronic device is able to receive data from meeting server application 20 (and/or from meeting management process 10). For example, mobile computing device 42, connected to server computer 12 via cellular communication channel 60 and network 14, may have a relatively slow connection for receiving data from meeting server application 20. As such, mobile computing device 42 may not be capable of receiving electronic meeting content (e.g., text documents, presentations slides, images, and the like) as quickly as the electronic meeting content is being presented. Such a situation may lead to delays in the meeting while the remaining participants (e.g., users 46, 48, 52) are waiting for user 50 to receive the electronic meeting content vial mobile computing device 42. Such delays in the meeting may result in breaks in the cognitive flow of the meeting and may reduce the social collaboration achieved by the group (e.g., caused by the remaining users waiting for user 50 to receive the electronic meeting content being discussed. Meeting management process 10 may, at least in part, alleviate at least a portion of the delays caused by the network conditions being experienced by user 50 (and mobile computing device 42), for example.

During the course of the electronic meeting, meeting management process 10 (alone or in conjunction with meeting server application 20) may transmit 100 a first portion of electronic meeting content to a first client computing device (e.g., mobile computing device 42 in the instant example). The first portion of electronic meeting content may be configured to provide a first content resolution that may be less than a full content resolution. The electronic meeting content (a first portion of which is transmitted 100 to mobile computing device 42) may include a piece of content that is shared and/or consumed at any given point in time during the electronic meeting. For example, during the electronic meeting one of the participants may present a slide show (e.g., a Microsoft PowerPoint® presentation slide show; PowerPoint is a registered trademark of Microsoft Corporation in the United States, other countries, or both) including multiple slides. The multiple slides of the slide show may, for example, be sequentially shared and/or consumed during the electronic meeting. The electronic meeting content (a first portion of which is transmitted 100 to mobile computing device 42) may include, for example, an individual one of the multiple slides of the slide show that is shared and/or consumed at a given point in time (e.g., the point in time during which transmission of a first portion of the individual slide occurs).

As used herein, resolution may refer to the level of completeness, included information, and detail of the electronic meeting content. Full content resolution may, therefore, include the level of completeness, included information, and detail provided by the individual presenting the electronic meeting content. In the above-example of an individual slide of a slide show, the full content resolution may include the complete slide as shared or presented, including all of the information, slide text, slide graphics, background graphics and/or text, and the like, including all formatting and structure according to the slide uploaded by the presenter for sharing/ consumption by the electronic meeting participants. The first content resolution, that may be less than the full content resolution, may be less complete and/or include less than all of the information and/or detail of the electronic meeting content.

Additionally, meeting management process 10 (alone or in conjunction with meeting server application 20) may also transmit 102 a second portion of electronic meeting content to the first client computing device (e.g., mobile computing device 42). The second portion of electronic meeting content may be configured to provide a second content resolution that is greater than the first content resolution. Accordingly, the second content resolution provided by second portion of the electronic meeting content may provide a greater level of completeness, information, and/or detail as compared to the first resolution provided by the first portion of the electronic meeting content. In this manner, meeting management process 10 may progressively refine the content resolution of the meeting content provided (e.g., transmitted) to the first client computing device (e.g., mobile computing device 42).

As will be appreciated electronic meeting content may have an at least generally defined structure, in which the electronic meeting content may include various components. In the above-discussed example of a presentation slide, the slide may include, for example, a slide may include slide text (e.g., a slide title, major headings, elaboration of headings, and the like), graphics (e.g., charts, diagrams, figures, and the like), background graphics and text, etc. The structure of the electronic meeting content may be defined through templates for various types of content. For example, the structure of a slide may be defined by the template used to create the slide. Similarly, the structure of an image may be defined by the image data (e.g., image type, aspect ratio, pixel count, etc.). Further, the structure of the electronic meeting content may be defined by a user (e.g., a user who created or assembled the electronic meeting content for sharing and/or by a user presenting the electronic meeting content via meeting server application 20), for example. Various other types of electronic meeting content may having similarly defined structures.

Figure 3:
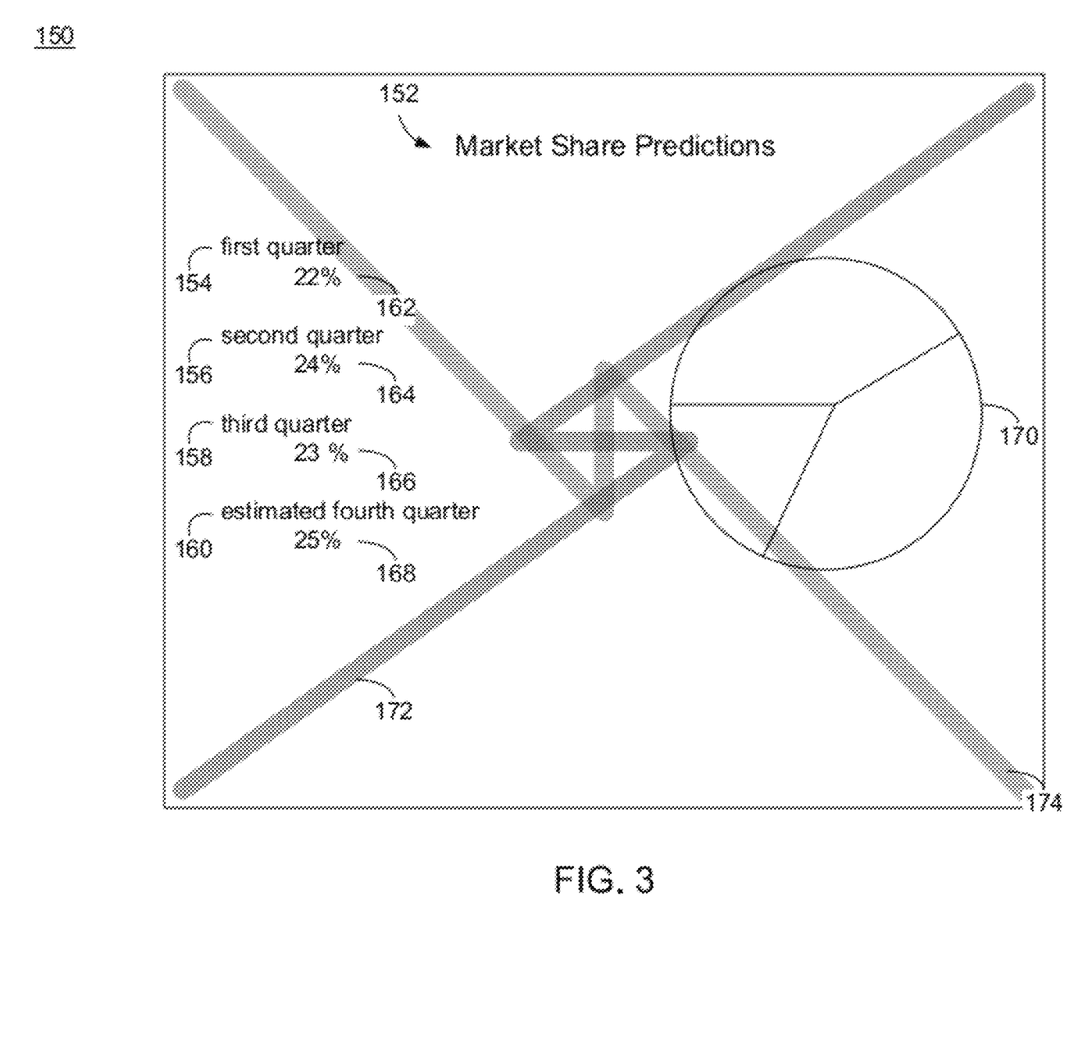
FIG. 3 graphically depicts electronic meeting content that may be transmitted by one or more of the meeting management process and meeting server application of FIG. 1.

Referring also to FIG. 3, and continuing with the above example in which the electronic meeting content is a slide, the electronic meeting content may include slide 150. Slide 150 may generally include slide title 152, major headings 154, 156, 168, and 160. Slide 150 may further include descriptive text 162, 164, 166, 168 and slide graphics (e.g., pie chart 170). Slide 150 may further include background graphics 172 and background text 174. The first portion of the electronic meeting content may be associated with at least a first component of the electronic meeting content. Similarly, the second portion of the electronic meeting content may be associated with at least a second component of the electronic meeting content. For example, the first potion of the electronic meeting content may include slide title 152 and other slide text (e.g., heading 154, 156, 158, 160 and descriptive text 162, 164, 166, 168). In such an embodiment, meeting management process 10 may transmit 100 a first portion (e.g., including slide title 152, headings 154, 156, 158, 160 and descriptive text 162, 164, 166, 168) of the meeting content (e.g., slide 150) to mobile computing device 42. As such, and referring to FIG. 4, mobile computing device (via client application 26) may render a first content resolution, including slide 150a that may include only slide title 152, headings 154, 156, 158, 160 and descriptive text 162, 164, 166, 168. As slide 150a (at a first content resolution) may be less than the full content resolution, the data transmitted 100 may be relatively smaller (e.g., than the data associated with full content resolution of slide 150). The relatively smaller transmission may be more quickly received by mobile computing device 42. User 50 may, therefore, receive at least a portion (i.e., the first portion) of the electronic meeting content. User 50 may, therefore, have enough information to participate in the electronic meeting without causing a delay in the meeting while the electronic meeting content is received and rendered by mobile computing device 42.

Figure 5:
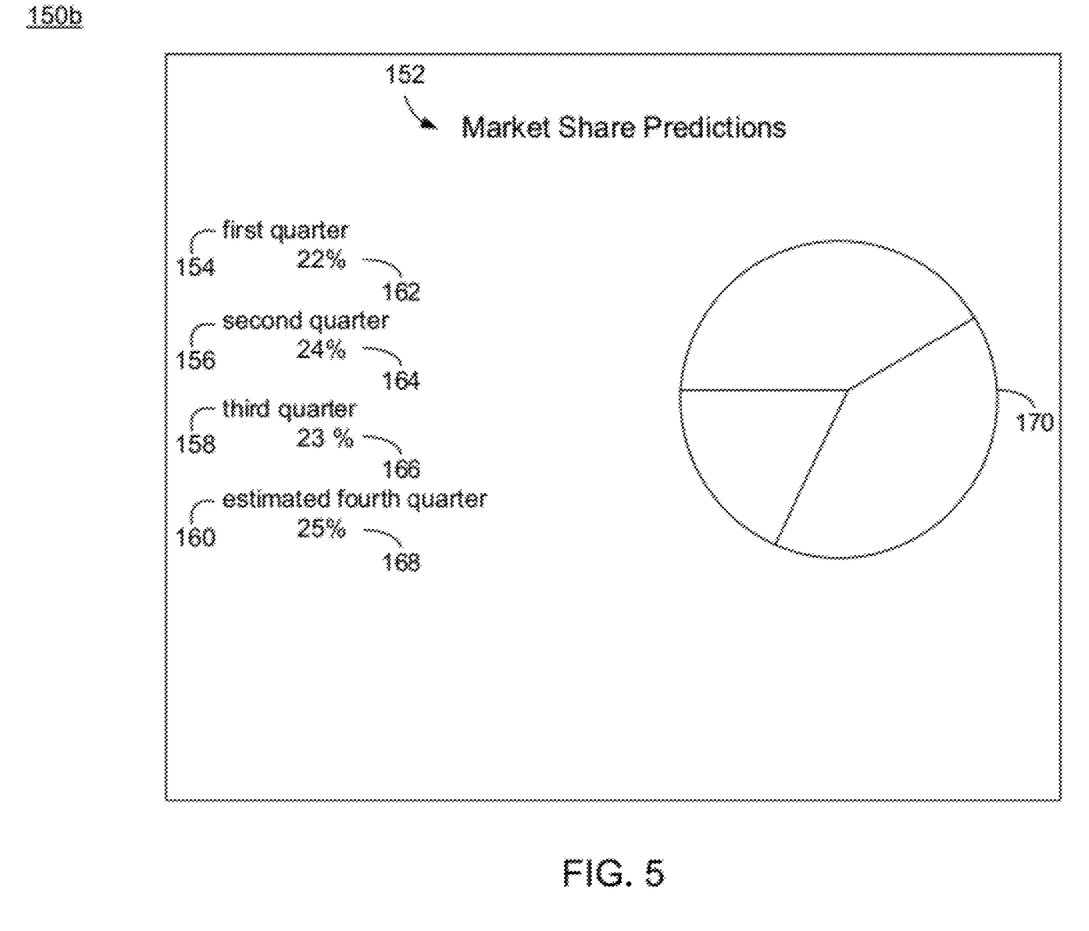
FIG. 5 graphically depicts a second content resolution of the electronic meeting content of FIG. 3.

As mentioned above, meeting management process 10 may also transmit 102 a second portion of the electronic meeting content (e.g., slide 150 in the foregoing example). The second portion of the electronic meeting content may be configured to provide a second content resolution that is greater than the first content resolution. For example, and referring also to FIG. 5, the second portion of electronic meeting content may include pie chart 170. The second portion of electronic meeting content (i.e., pie chart 170 in the instant example) may be configured to provide a second content resolution that is greater than the first content resolution. For example, as shown, the second content resolution may include slide 150b including slide title 152, headings 154, 156, 158, 160 and descriptive text 162, 164, 166, 168, as well as pie chart 170. The second portion of the electronic meeting content may be configured to provide the second content resolution in conjunction with the first portion of the electronic meeting content. For example, as shown, slide 150b may include both the first portion of the electronic meeting content (e.g., slide title 152, headings 154, 156, 158, 160 and descriptive text 162, 164, 166, 168) as well as the second portion of the electronic meeting content (e.g., pie chart 170). As such, meeting management process 10 may progressively refine the resolution of the electronic meeting content available on mobile computing device 42.

Figure 6:
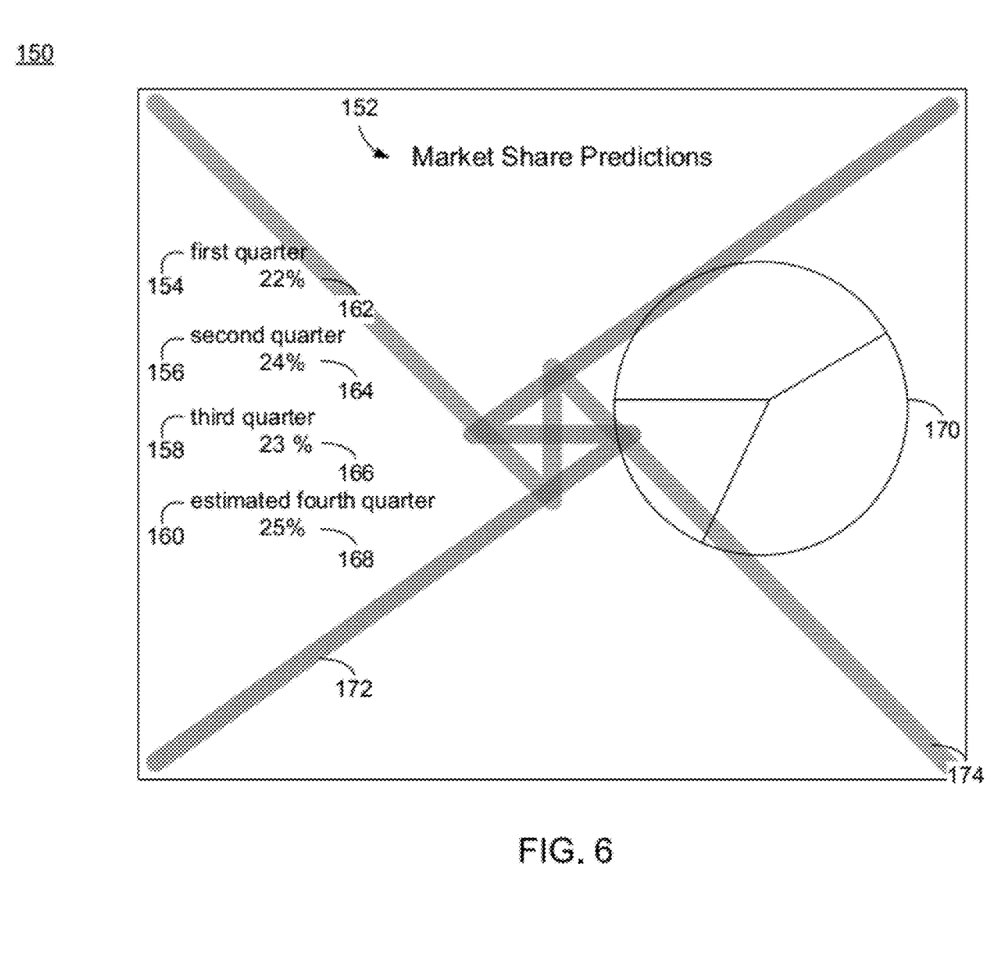
FIG. 6 graphically depicts an additional content resolution of the electronic meeting content of FIG. 3.

Continuing with the concept of progressively refining the resolution of the electronic meeting content available on the first client computing device (e.g., mobile computing device 42), meeting management process 10 may transmit 104 one or more additional portions of the electronic meeting content to the first client computing device. The one or more additional portions of the electronic meeting content may be configured to provide a content resolution greater than the second content resolution. Still continuing with the above-stated example, and referring also to FIG. 6, the one or more additional portions of the electronic meeting content (e.g., slide 150) may include background graphics 172 and background text 174. Meeting management process 10 may, accordingly, transmit 104 background graphics 172 and background text 174 to mobile computing device 42. Background graphics 172 and background text 174 may be configured to provide a content resolution that is greater than the second content resolution. In the instant example, background graphics 172 and background text 174 may complete slide 150 (e.g., the electronic meeting content). As such, the content resolution provided by these additional portions of the electronic meeting content may be the full content resolution. As such, the progressive refinement of the resolution of the electronic meeting content may continue until full content resolution is achieved, or until the electronic meeting content is no longer valid. As described above, the electronic meeting content may include a piece of content being shared and/or consumed at a given point in time. The electronic meeting content may cease to be valid, for example, when the slide show is advanced to the next slide (e.g., slide 150 is no longer the slide being shared and/or consumed). At such point in time, meeting management process 10 may then repeat the above described process for the new electronic meeting content (e.g., the next slide).

As will be appreciated, meeting management process 10 may be particularly useful when, as noted above, one or more of the participants in the electronic meeting are experiencing network conditions that may impeded optimum reception of electronic meeting content. Meeting management process 10 may at least partially alleviate the impact of less than optimum network conditions by transmitting 100, 102, 104 various portions of the electronic meeting content to provide a user initially with a first content resolution that may be progressively refined. The number and nature of the portions of electronic meeting content transmitted 100, 102, 104 to the first client computing device may, in some embodiments, depend, at least in part, upon the network conditions being experienced and the reception capacity associated with the first client computing device (e.g., mobile computing device 42 in the previously described example). In this regard, meeting management process 10 may determine 106 a reception capacity associated with the first client computing device. The reception capacity of the first client computing device may include the rate at which the first client computing device is able to receive data transmitted from meeting server application 20 and/or meeting management process 10. In some embodiments, meeting management process 10 may determine a reception capacity associated with each participant client computing device. In this manner, electronic meeting content transmission for each participant may be influenced based upon, at least in part, network conditions being experienced by each of the participants client computing device.

Various techniques may be implemented for determining 106 a reception capacity associated with the first client computing device. For example, the server (e.g., meeting server application 20, meeting management process 10, and/or one or more additional reception capacity determination processes associated with server computer 12) may transmit a file of a known size to the first client computing device and measure the time necessary for the first client computing device to download the file. The reception capacity associated with the first client computing device may be determined 106 based upon, at least in part, the time necessary for the first client computing device to download the file of know size. Similarly, meeting management process 10 (alone and/or in conjunction with one or more other processes) may repeat the timed download of a file of known size more than once and average the reception capacity of the first client computing device. Additionally, the first client computing device may provide a configuration value to meeting management process 10. The configuration value may be indicative of a connection type. Meeting management process 10 may determine 106 a reception capacity associated with the first client computing device based upon the connection type (e.g., various connection types may have an assumed reception capacity). Further, determining 106 a reception capacity associated with the first client computing device may include a participant user (e.g., user) selecting a connection type (e.g., via mobile computing device 42) and transmitting the selected connection type to meeting management process 10. Meeting management process 10 may determine 106 a reception capacity associated with the first client computing device (e.g., mobile computing device 42) based upon the user selected connection type (e.g., various connection types may have an assumed reception capacity). Various additional/alternative mechanisms may be implemented for determining a reception capacity of the first client computing device, as will readily be appreciated.

Meeting management process 10 may determine 106 a reception capacity associated with the first client computing device at more than one point in time. For example, meeting management process 10 may periodically and/or continuously determine 106 a reception capacity associated with the first client computing device over the course of the electronic meeting session. As such, meeting management process 10 may determine if a reception capacity associated with the first client computing device varies through the electronic meeting session. In the event of such various, meeting management process 10 may vary the transmission 100, 102, 104 of portions of electronic meeting content to provide continued satisfactory participation of the effected user in the electronic meeting.

The first portion of the electronic meeting content may be based upon, at least in part the determined 106 reception capacity associated with the first client computing device. As discussed above, electronic meeting content may include various components arranged according to a defined structure (e.g., a structured defined by a template, the nature of the electronic meeting content, or defined by a user). The structure of the electronic meeting content may imply an importance. For example, in the example of slide 150, slide title 152 and major heading 145, 156, 158, 160 may be deemed (e.g., based upon the template and/or user definition) the most important components of slide 150. As also discussed above, the structure and the relative importance of the components of electronic meeting content may be defined based upon, at least in part, for example, templates, the nature of the content, user definition (e.g., a presenter/creator of the electronic meeting content may define title 152 and chart 170 to be the most important components of slide 150).

Based upon, at least in part, the determined reception capacity associated with the first client computing device, meeting management process 10 may give priority to different parts of the electronic meeting content relative to the importance of the components of the electronic meeting content. For example, mobile computing device 42 may be determined 106 to have a relatively low reception capacity (e.g., resulting from low available bandwidth, high network latency or congestion, etc.). In order to ensure that user 50 (via mobile computing device 42) may timely receive important components of the electronic meeting content to maintain the flow of the meeting, the first portion of the electronic meeting content may be limited to only the most important components of the electronic meeting content (e.g., as including additional components in the first portion may result in undesired delay in receiving the transmitted 100 first portion of the electronic meeting content. For example, if title 152 and chart 170 are determine (e.g., based upon a template, user definition, etc.) to be the most critical components of slide 150, the first portion of the electronic meeting content transmitted 100 to mobile computing device 42 may only include title 152 and chart 170. As such, user 50 of mobile computing device 42 (which may be determined 106 to have a relatively low reception capacity) may at least be able to keep up with the broad-strokes of the meeting (e.g., without experiencing a cognitive break with the remaining participants). As also discussed above, while initially meeting management process 10 may only transmit 100 the most important components of the electronic meeting content to user 50 (via mobile computing device 42), the electronic meeting content received by user 50 (e.g., transmitted 100 by meeting management process 10) may be refined by subsequent transmissions 102, 104 from meeting management process 10 until the entirety of the electronic meeting content is received, or the electronic meeting content is no longer valid.

Figure 4:
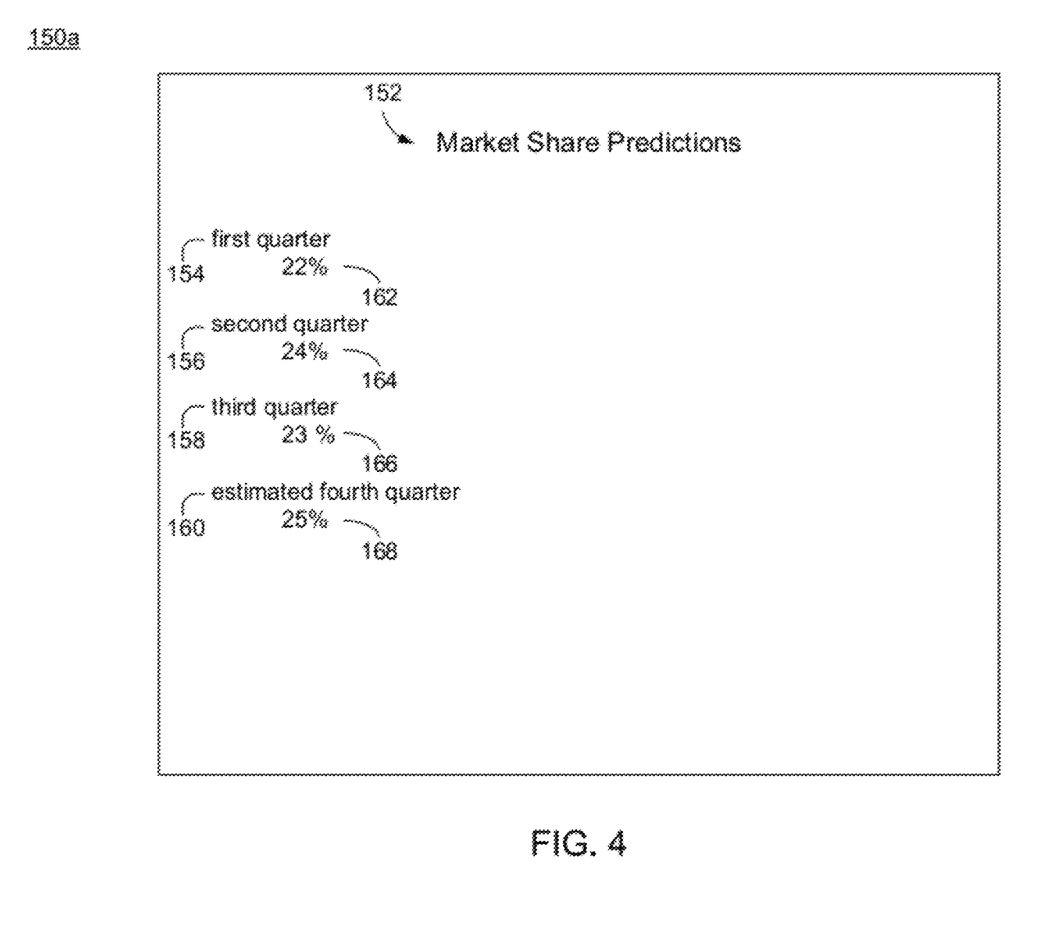
FIG. 4 graphically depicts a content resolution of the electronic meeting content of FIG. 3.
Figure 7:
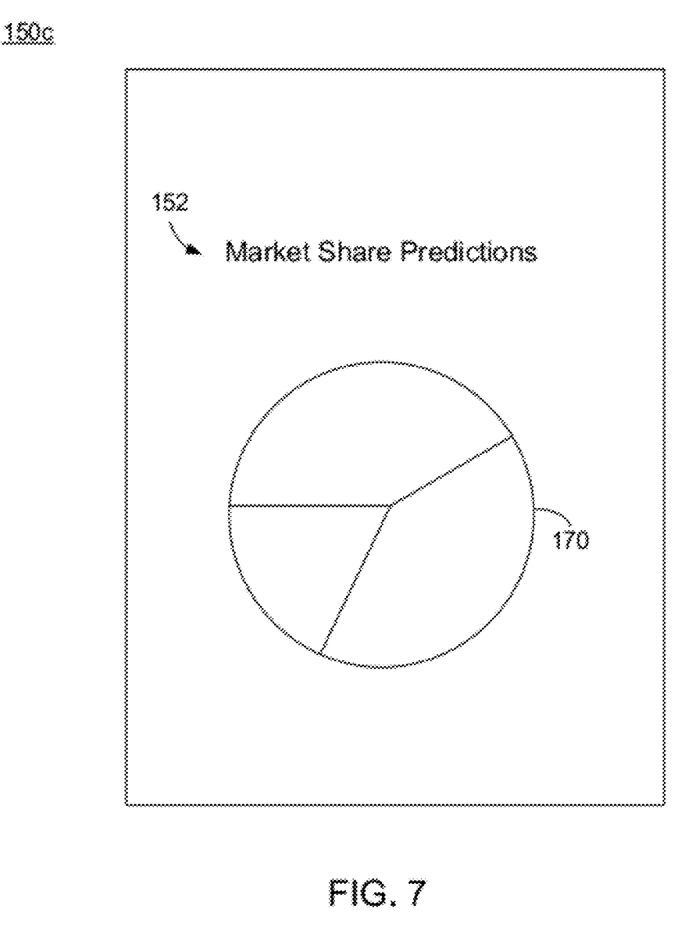
FIG. 7 graphically depicts a content resolution of the electronic meeting content of FIG. 3.

Consistent with the foregoing description, electronic meeting content may be delivered to (e.g., transmitted 100, 102, 104 by meeting management process 10) in a manner that may be sensitive to the structure of the content and the importance of various components defined within the structure of the electronic meeting content. In addition/as an alternative to selecting the components of the first portion of electronic meeting content to be transmitted 100 based upon, at least in part, the determined 106 reception capacity associated with the first client computing device, the structure and/or other attributes of the components of the content transmitted 100 as the first portion of the electronic meeting content may be adapted based upon, at least in part, the reception capacity of the first client electronic device. For example, and as briefly discussed above, when mobile device 42 has a relatively low associated reception capacity condition, in addition/as an alternative to simply transmitting 100 a first portion of electronic meeting content that includes only the most important components (e.g., as defined by a template, a user, etc.), the first portion of the electronic meeting content transmitted 100 to mobile computing device 42 may be structurally based upon, at least in part, the reception capacity associated with mobile computing device 42. For example, the first portion of the electronic meeting content may include only title 152 and chart 170 without regard for the formatting of slide 150. As shown in FIG. 4, the first portion of the electronic meeting content may be configured to provide a first content resolution (e.g., indicated by slide 150*a*) that may be formatted according to the electronic meeting content (e.g., slide 150), but only include a portion of the information. In another embodiment, shown in FIG. 7, rather than transmitting 100 the first portion of electronic meeting content formatted according slide 150, the first portion of electronic meeting content may be transmitted with fewer formatting cues. In such an embodiment, transmitted 100 first portion of the electronic meeting data (e.g., slide 150) may be configured to provide a first content resolution as shown in slide 150*c*. As such, meeting management process 10 may adapt what is transmitted 100, 102, 104 based upon, at least in part, the reception capacity of the first client computing device.

While the foregoing example has been described in the context of a slide show presentation, it will be readily appreciated that the described method may equally be applied to other forms of electronic meeting content. For example, in the context of a text document, the document may be transmitted 100, 102, 104 in sections (e.g., each portion includes a single paragraph, a single page, etc.), stripped of formatting (e.g., special fonts and formatting may be removed and only the raw text transmitted 100 as the first portion to be rendered in a plain text format, and formatting information may be transmitted 102, 104 as subsequent portions of the electronic meeting content). Similarly, in the case of electronic meeting content including images, a first portion of the image may be transmitted 100 configured to provide the image having a first pixel count less than the full pixel count of the image. Subsequent portions of the image may be transmitted 102, 104 to provide the image having progressively increasing pixel count until a full pixel count is achieved (and/or the image ceases to be valid electronic meeting content). Other electronic meeting content types may be handled in a similar manner. As such, meeting management process 10 may, in some embodiments, allow the collaborative flow of the electronic meeting to be preserved, and for other meeting participants to not be delayed waiting for content to appear for a participant operating on a slow network condition. In this manner, meeting management process 10 may, in some instances, be able to influence a participant of an electronic meeting's experience.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method comprising:
    transmitting, by a computing device, a first portion of electronic meeting content to a first client computing device, the first portion of the electronic meeting content configured to provide a first content resolution that is less than a full content resolution; and
    transmitting, by the computing device, a second portion of the electronic meeting content to the first client computing device, the second portion of the electronic meeting content configured to provide a second content resolution that is greater than the first content resolution;

wherein the second portion of the electronic meeting content combined with the first portion of the electronic meeting content provides progressive refinement of electronic meeting content transmitted to the first client computing device.

2. The computer implemented method according to claim 1, further including determining a reception capacity associated with the first client computing device.

3. The computer implemented method according to claim 2, wherein the first portion of the electronic meeting content is based upon, at least in part the determined reception capacity associated with the first client computing device.

4. The computer implemented method according to claim 1, wherein the first portion of the electronic meeting content is associated with at least a first component of the electronic meeting content.

5. The computer implemented method according to claim 1, wherein the second portion of the electronic meeting content is associated with at least a second component of the electronic meeting content.

6. The computer implemented method according to claim 1, wherein the second portion of the electronic meeting content is configured to provide the second content resolution in conjunction with the first portion of the electronic meeting content.

7. The computer implemented method according to claim 1, further comprising transmitting one or more additional portions of the electronic meeting content to the first client computing device, wherein the one or more additional portions of the electronic meeting content are configured to provide a content resolution greater than the second content resolution.

* * * * *